US009356698B2

(12) United States Patent
Guillory et al.

(10) Patent No.: US 9,356,698 B2
(45) Date of Patent: May 31, 2016

(54) METHOD AND MODULE FOR PROCESSING A REQUEST FOR TRANSMITTING A RADIO SIGNAL IN AN ROF SYSTEM

(75) Inventors: Joffray Guillory, Saint-Brieuc (FR); Sylvain Meyer, Bulat-Pestivien (FR)

(73) Assignee: FRANCE TELECOM, Paris (FR)

( * ) Notice: Subject to any disclaimer, the term of this patent is extended or adjusted under 35 U.S.C. 154(b) by 58 days.

(21) Appl. No.: 13/638,222

(22) PCT Filed: Mar. 23, 2011

(86) PCT No.: PCT/FR2011/050617
§ 371 (c)(1),
(2), (4) Date: Nov. 29, 2012

(87) PCT Pub. No.: WO2011/121212
PCT Pub. Date: Oct. 6, 2011

(65) Prior Publication Data
US 2013/0077977 A1      Mar. 28, 2013

(30) Foreign Application Priority Data

Mar. 30, 2010 (FR) ..................................... 10 52356

(51) Int. Cl.
*H04B 10/2575* (2013.01)
*H04Q 11/00* (2006.01)
(52) U.S. Cl.
CPC .... *H04B 10/25754* (2013.01); *H04B 10/25759* (2013.01); *H04Q 2011/0094* (2013.01)
(58) Field of Classification Search
CPC ...................... H04B 10/2575–10/25759; H04B 10/272–10/2715; H04J 14/0278–14/0279; H04J 14/08–14/086; H04Q 2011/0064; H04Q 2011/0094
USPC ............................ 398/45, 115–117, 140–172
See application file for complete search history.

(56) References Cited

U.S. PATENT DOCUMENTS 5,189,414 A * 2/1993 Tawara .......................... 370/502
5,995,256 A * 11/1999 Fee ................................. 398/34

(Continued)

FOREIGN PATENT DOCUMENTS

EP            1988650 A1      11/2008

OTHER PUBLICATIONS

French Search Report dated Nov. 11, 2010 for corresponding French Application No. 1052356, filed on Mar. 30, 2010.

(Continued)

*Primary Examiner* — David Payne
*Assistant Examiner* — Casey Kretzer
(74) *Attorney, Agent, or Firm* — David D. Brush; Westman, Champlin & Koehler, P.A.

(57) ABSTRACT

A method and apparatus for processing a request to transmit a radio signal emitted by a radio terminal to a radio management module. The radio management module authorizes the radio terminal to emit the radio signal to a radio module associated with the radio terminal. The radio module has optical processing elements connected to one end of an optical link via which the radio signal modulated on the optical carrier is to be transmitted. The method includes the following steps, applied by an optical management module connected to the radio management module: generating an activation request to activate the optical processing elements of the radio module associated with the terminal by transmission-related parameters included in the transmission request, the transmission-related parameters being transmitted to the optical management module by the radio management module, and emitting, to the associated radio module, the activation request to activate the optical processing elements.

9 Claims, 3 Drawing Sheets

(56) References Cited

U.S. PATENT DOCUMENTS

| | | | |
|---|---|---|---|
| 7,031,343 B1* | 4/2006 | Kuo et al. | 370/473 |
| 2002/0181444 A1 | 12/2002 | Acampora | |
| 2004/0196862 A1* | 10/2004 | Song et al. | 370/442 |
| 2004/0258414 A1* | 12/2004 | Lee | H04B 10/1123 398/115 |
| 2006/0221924 A1* | 10/2006 | Yang et al. | 370/338 |
| 2007/0150927 A1* | 6/2007 | Chapman | 725/111 |
| 2009/0116843 A1 | 5/2009 | Rohde | |
| 2009/0214206 A1* | 8/2009 | Ozaki | 398/43 |
| 2011/0026474 A1* | 2/2011 | Freda | H04K 1/10 370/329 |

OTHER PUBLICATIONS

International Preliminary Report on Patentability and English Translation of the Written Opinion dated Oct. 2, 2012 for corresponding International Application No. PCT/FR2011/050617, filed on Mar. 23, 2011.

International Search Report and Written Opinion dated May 30, 2011 for corresponding International Application No. PCT/FR2011/050617, filed Mar. 23, 2011.

* cited by examiner

METHOD AND MODULE FOR PROCESSING A REQUEST FOR TRANSMITTING A RADIO SIGNAL IN AN ROF SYSTEM

CROSS-REFERENCE TO RELATED APPLICATIONS

This Application is a Section 371 National Stage Application of International Application No. PCT/FR2011/050617, filed Mar. 23, 2011, which is incorporated by reference in its entirety and published as WO 2011/121212 on Oct. 6, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure is situated in the telecommunications field and more particularly in the field of radio transmission over an optical fiber or RoF (Radio over Fiber).

BACKGROUND OF THE DISCLOSURE

Figure 1:
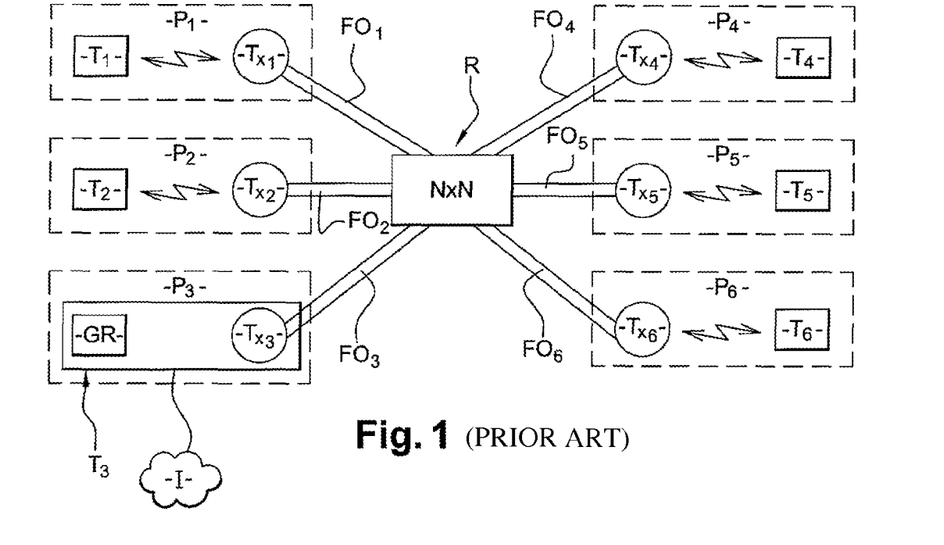
FIG. 1 represents an optical network in which a radio signal is transmitted according to the prior art.

FIG. 1 shows an optical network R in which a radio signal is transmitted via an optical fiber.

In such a network R, a first radio module $Tx_1$ is connected to a first end of an optical link $FO_1$ comprising two optical fiber segments, each of the segments of the optical fiber being associated with one transmission direction of an optical signal in order to allow a two-way transmission of the data. Such a radio module $Tx_1$ is situated in a first room P1, of a domestic or business premises. A second end of the optical link $FO_1$ is connected to two ports of a passive optical coupler N×N, in which for example N=6 as shown in FIG. 1. Such an optical coupler makes it possible to add together the various optical signals that it receives and then to broadcast this total to all the items of equipment that are connected thereto. A radio terminal $T_1$, such as a personal computer fitted with radio emission/reception means such as an ultrawide band (UWB) processor, is also placed in the room P1 and is capable of emitting a radio signal to the radio module $Tx_1$ and to receive a radio signal emitted by the radio module $Tx_1$. Several radio terminals $T_m$ can be connected to one and the same radio module $Tx_i$.

A second radio module $Tx_2$ is connected to a first end of an optical link $FO_2$. Such a radio module $Tx_2$ is situated in a second room P2 of a domestic or business premises. A second end of the optical link $FO_2$ is connected to two ports of the N×N coupler. A radio terminal $T_2$ is also placed in the room P2 and is capable of emitting a radio signal to the radio module $Tx_2$ and of receiving a radio signal emitted by the radio module $Tx_2$.

The same applies to the radio modules $Tx_4$, $Tx_5$, $Tx_6$ which are respectively connected to a first end of the optical links $FO_4$, $FO_5$, $FO_6$. A second end of the optical links $FO_4$, $FO_5$, $FO_6$ are respectively connected to two ports of the N×N coupler. Radio terminals $T_4$, $T_5$, $T_6$ are respectively placed in the rooms P4, P5, P6 in which the radio modules $Tx_4$, $Tx_5$, $Tx_6$ are respectively placed.

A radio terminal $T_3$ is placed in a third room P3. Such a radio terminal $T_3$ comprises radio management means GR and a radio module $Tx_3$ connected to a first end of an optical link $FO_3$. A second end of the optical link $FO_3$ is connected to two ports of the N×N coupler. Such a radio terminal T3 is for example an item of equipment providing the interface between the network R and a second network I, such as the internet. In such a situation, the item of equipment providing the interface is a domestic gateway or an enterprise gateway depending on whether the network R is a domestic network or an enterprise network.

Figure 2:
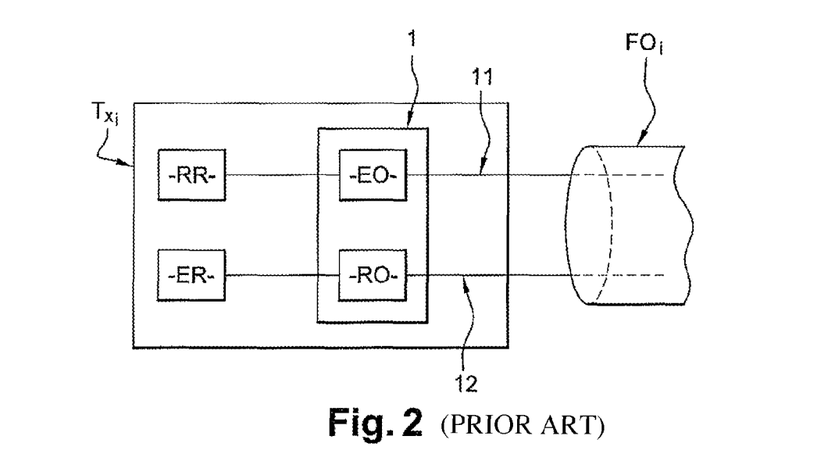
FIG. 2 represents a radio module capable of applying the RoF technology.

With reference to FIG. 2, a radio module $Tx_i$ comprises emission/reception means ER/RR for emitting/receiving a radio signal and optical processing means 1 for processing a radio signal. The emission/reception means ER/RR are connected respectively to reception means RO of an optical carrier and to emission means EO of an optical carrier. The optical emission means EO are connected to a first optical fiber 11 forming an optical link $FO_i$. The optical reception means RO are connected to a second segment of optical fiber 12 forming the optical link $FO_i$. The emission/reception means EO/RO are included in the optical processing means 1.

When the radio signal is received by the radio reception means RR of the radio module $Tx_i$, it is transmitted to the optical emission means EO. The optical emission means EO modulate an optical carrier with the radio signal received by the radio reception means RR and intended to be transmitted over the optical link $FO_i$. Once the optical carrier has been modulated, it is transmitted over the optical fiber segment 11. When the optical carrier is modulated, the data forming the radio signal remain in the native format of the radio signal.

When an optical carrier is received by the optical reception means RO, the latter demodulate the optical carrier. The data thus obtained are then transmitted to the radio emission means ER which then emit a radio signal to the radio terminal $T_m$.

When the radio reception means RR detect a radio signal, the latter is transmitted to optical emission means EO whether the detected radio signal is a radio signal comprising payload data or an interference radio signal containing no payload data. The optical emission means EO then modulate an optical carrier with the data included in the received radio signal, then the optical carrier is transmitted over the optical fiber segment 11 to the various radio modules $Tx_i$ belonging to the network R. On reception of the optical carrier, the optical reception means RO of the various radio modules $Tx_i$ of the network R generate a radio signal emitted by the radio emission means ER to the radio terminals associated with the radio modules.

The transmission of interference radio signals over the network generates noise disrupting the transmission of the payload radio signals and induces a loss in transmission byte rate. Such circumstances negatively impact the quality of service within the network R.

SUMMARY

An illustrative embodiment of the invention proposes a method for processing a request to transmit a radio signal emitted by a radio terminal to a radio management module, the radio management module being capable of authorizing the radio terminal to emit the radio signal to a radio module associated with the radio terminal, the radio module comprising optical processing means capable of modulating the radio signal received on an optical carrier and vice versa, the optical processing means being connected to one end of an optical link via which the radio signal modulated on the optical carrier is intended to be transmitted.

Such a communication method comprises the following steps, applied by an optical management module connected to the radio management module:

generation of an activation request to activate the optical processing means of the radio module associated with the terminal according to transmission-related parameters included in the transmission request, the transmission-related parameters being transmitted to the optical management module by the radio management module, emitting, to at least the associated radio module, the activation request to activate the optical processing means.

In such a solution, the optical management module is for example connected to each radio module of the communication network by means of dedicated wire links or else by means of optical links belonging to the communication network.

In the proposed solution, the optical processing means of the various radio modules are activated by the optical management module when the latter has received a radio signal transmission request transmitted by the radio management module.

The solution that is the subject of an embodiment of the invention consequently makes it possible to control optical emission/reception means based on transmission-related parameters of radio signals.

Thus, the optical processing means of the radio modules are not activated when the radio module detects an interference radio signal in contrast to what happens in the prior art.

Such a solution makes it possible to reduce the noise associated with the detection and the transmission of interference radio signals by the radio modules belonging to the network and thus helps to improve the quality of service within the network.

According to one particular feature, the processing method comprises a step of emitting, to at least the associated radio module, a deactivation request to deactivate the optical processing means.

Once the radio signal has been transmitted over the optical link, the optical processing means are deactivated thus preventing the transmission of interference radio signals over the communication network.

According to one particular feature of the processing method that is the subject of an embodiment of the invention, the transmission-related parameters comprise an identifier of the terminal emitting the radio signal, an item of information relating to the duration of the transmission.

An embodiment of the invention also relates to a method for the transmission of a radio signal by a radio module associated with a radio terminal, the radio terminal being authorized by a radio management module to emit the radio signal to the radio module, the radio module comprising optical processing means capable of modulating the radio signal received on an optical carrier and vice versa, the optical processing means being connected to one end of an optical link via which the radio signal modulated on the optical carrier is intended to be transmitted.

Such a transmission method comprises a step of reception by the radio module of an activation request to activate the optical processing means, said request being generated by an optical management module connected to the radio management module according to transmission-related parameters included in a transmission request emitted by the radio terminal to the radio management module.

Such a solution saves energy. Specifically, since the optical processing means are activated only when a radio signal comprising payload data is intended to be transmitted, they do not require a power supply in a continuous manner as is the case in the prior art.

A further subject of an embodiment of the invention is an optical management module capable of processing a request to transmit a radio signal emitted by a radio terminal to a radio management module, the radio management module being capable of authorizing the radio terminal to emit the radio signal to a radio module associated with the radio terminal comprising optical processing means capable of modulating the radio signal received on an optical carrier and vice versa, the optical processing means being connected to one end of an optical link via which the radio signal modulated on the optical carrier is intended to be transmitted.

Such an optical management module being connected to the radio management module comprises:

means for generating an activation request to activate the optical processing means of the radio module associated with the terminal according to transmission-related parameters included in the transmission request, the transmission-related parameters being transmitted to the optical management module by the radio management module, means for emitting, to at least the associated radio module, the activation request to activate the optical processing means.

An embodiment of the invention also relates to a radio module associated with a radio terminal, the radio terminal being authorized by a radio management module to emit the radio signal to the radio module, the radio module comprising optical processing means capable of modulating the radio signal received on an optical carrier and vice versa, the optical processing means being connected to one end of an optical link via which the radio signal modulated on the optical carrier is intended to be transmitted.

Such a radio module comprises means for receiving an activation request to activate the optical processing means generated by an optical management module connected to the radio management module according to transmission-related parameters included in a transmission request emitted by the radio terminal to the radio management module.

A further subject of an embodiment of the invention is a communication network comprising at least one radio terminal capable of emitting a request to transmit a radio signal to a radio management module, the radio management module being capable of authorizing the radio terminal to emit the radio signal to a radio module associated with the radio terminal comprising optical processing means capable of modulating the radio signal received on an optical carrier and vice versa, the optical processing means being connected to one end of at least one optical link via which the radio signal modulated on the optical carrier is intended to be transmitted.

Such a network comprises an optical management module connected to the radio management module, the optical management module comprising:

means for generating an activation request to activate the optical processing means of the radio module associated with the terminal according to transmission-related parameters included in the transmission request, the transmission-related parameters being transmitted to the optical management module by the radio management module, means for emitting, to at least the associated radio module, the activation request to activate the optical processing means, the radio module comprising means for receiving the activation request to activate the optical processing means, said request being generated by the optical management means.

According to other aspects, an embodiment of the invention also relates to computer programs comprising program-code instructions for the application of the steps of the transmission and processing methods described above when these programs are executed by a computer.

Each of the computer programs described above can use any programming language and be in source code form, object code form or intermediate code form between source code and object code, such as in a partially compiled form, or in any other desirable form.

A further subject of an embodiment of the invention is a recording medium that can be read by a computer on which a computer program as described above is recorded.

The data medium may be any entity or device capable of storing the program. For example, the medium may comprise a storage medium, such as a ROM (for "Read Only Memory"), for example a CD ROM or a microelectronic circuit ROM, or else a magnetic recording means, for example a diskette (floppy disc) or a hard disk.

Moreover, the data medium may be a medium that can be transmitted such as an electrical or optical signal which can be routed via an electric or optical cable, by radio or by other means. The program according to an embodiment of the invention may, in particular, be uploaded to a network of the internet type.

Alternatively, the data medium may be an integrated circuit in which the program is incorporated, the circuit being suitable for executing or for being used in the execution of the method in question.

BRIEF DESCRIPTION OF THE DRAWINGS

Other features and advantages will appear on reading embodiments described with reference to the drawings in which.

DETAILED DESCRIPTION OF ILLUSTRATIVE EMBODIMENTS

Figure 3:
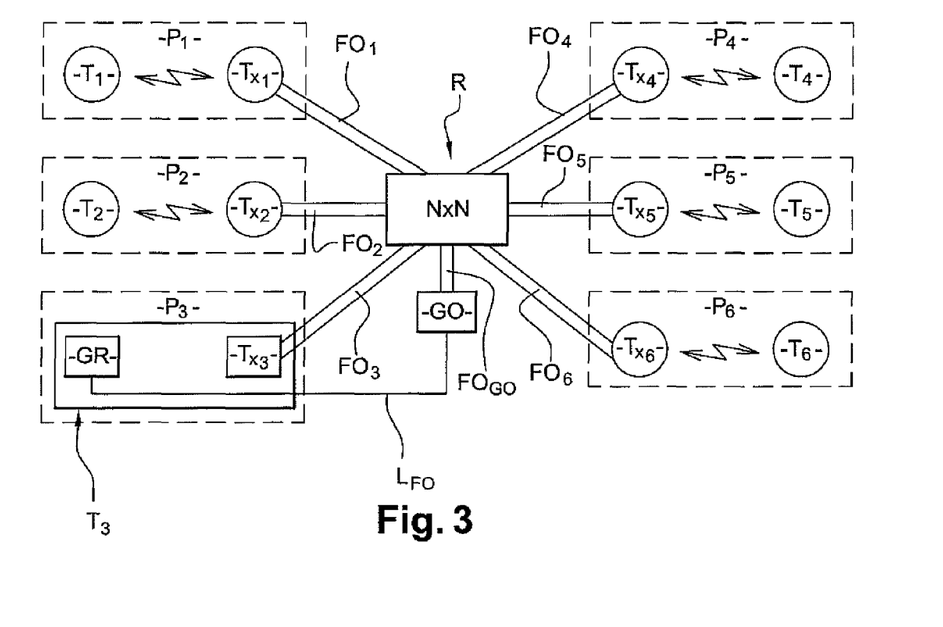
FIG. 3 represents a network in which a radio signal is transmitted according to RoF technology according to a first embodiment of the invention.

FIG. 3 represents a private optical network R such as a domestic network or an enterprise network according to a first embodiment of the invention.

In such a network R, a first radio module $Tx_1$ is connected to a first end of an optical link $FO_1$ comprising two optical fiber segments, each of the segments of optical fiber being associated with one direction of transmission of an optical signal in order to allow a two-way transmission of data. Such a radio module $Tx_1$ is situated in a first room P1 of a domestic or business premises. A second end of the optical link $FO_1$ is connected to two ports of an N×N passive optical coupler, where for example N=6 as shown in FIG. 1. Such an optical coupler makes it possible to add together the various optical signals that it receives and then to broadcast this total to all the items of equipment that are connected thereto. A radio terminal $T_1$, such as a personal computer, an audiovisual terminal or a telephone of the "Smartphone" type fitted with radio emission/reception means such as an ultrawide band (UWB) processor, is also placed in the room P1 and is capable of emitting a radio signal to the radio module $Tx_1$ and of receiving a radio signal emitted by the radio module $Tx_1$. Several radio terminals $T_m$ may be connected to one and the same radio module $Tx_i$.

A second radio module $Tx_2$ is connected to a first end of an optical link $FO_2$. Such a radio module $Tx_2$ is situated in a second room P2 of a domestic or business premises. A second end of the optical link $FO_2$ is connected to two ports of the N×N coupler. A radio terminal $T_2$ is also placed in the room P2 and is capable of emitting a radio signal to the radio module $Tx_2$ and of receiving a radio signal emitted by the radio module $Tx_2$.

The same applies for the radio modules $Tx_4$, $Tx_5$, $Tx_6$ which are respectively connected to a first end of the optical links $FO_4$, $FO_5$, $FO_6$. A second end of the optical links $FO_4$, $FO_5$, $FO_6$ is respectively connected to two ports of the N×N coupler. Radio terminals $T_4$, $T_5$, $T_6$ are respectively placed in the rooms P4, P5, P6 in which are placed respectively the radio modules $Tx_4$, $Tx_5$, $Tx_6$.

A radio terminal $T_3$ is placed in a third room P3. Such a radio terminal $T_3$ comprises radio management means GR and a radio module $Tx_3$ connected to a first end of an optical link $FO_3$. A second end of the optical link $FO_3$ is connected to two ports of the N×N coupler. Such a radio terminal T3 is for example an item of equipment providing the interface between the network R and a second network I, such as the internet. In such a situation, the item of equipment providing the interface is a domestic gateway or an enterprise gateway depending on whether the network R is a domestic network or an enterprise network.

When a radio terminal $T_m$ must emit a radio signal over the network R, a data transmission request is emitted by the radio emission/reception means of the radio terminal to the radio management module GR of the radio terminal $T_3$ which plays the role of radio coordinator for the network R.

A radio module $Tx_i$ comprises emission/reception means ER/RR for a radio signal and optical processing means 1 for a radio signal. The emission/reception means ER/RR are connected respectively to means for receiving an optical carrier RO and to means for emitting an optical carrier EO. The optical emission means EO are connected to a segment of optical fiber 11 forming the optical link $FO_i$. The optical reception means RO are connected to a segment of optical fiber 12 forming the optical link $FO_i$.

An optical management module GO is connected on the one hand to the N×N coupler by means of an optical link $FO_{GO}$ and on the other hand to the radio management module GR by means of a dedicated link $L_{GO}$. Such a link $L_{GO}$ is for example a copper pair. The function of the optical management module GO is to transmit to all the radio modules $Tx_i$, or else to some of them, a control signal comprising an activation request to activate the optical processing means EO/RO of the radio modules $Tx_i$. In one particular embodiment of the invention, the optical management module GO also emits a deactivation request to deactivate the optical processing means once the radio signal to be emitted has been processed. The activation and deactivation requests are generated by the optical management module GO following the transmission by the radio management module GR of a transmission request to transmit a radio signal.

Such a transmission request comprises transmission-related parameters of the radio signal such as an identifier of the terminal emitting the radio signal, an identifier of at least one radio terminal intended to receive the radio signal, an item of information relating to duration of transmission.

Thus, the solution that is the subject of an embodiment of the invention makes it possible to control optical emission/reception means based on transmission-related parameters of radio signals.

Figure 4:
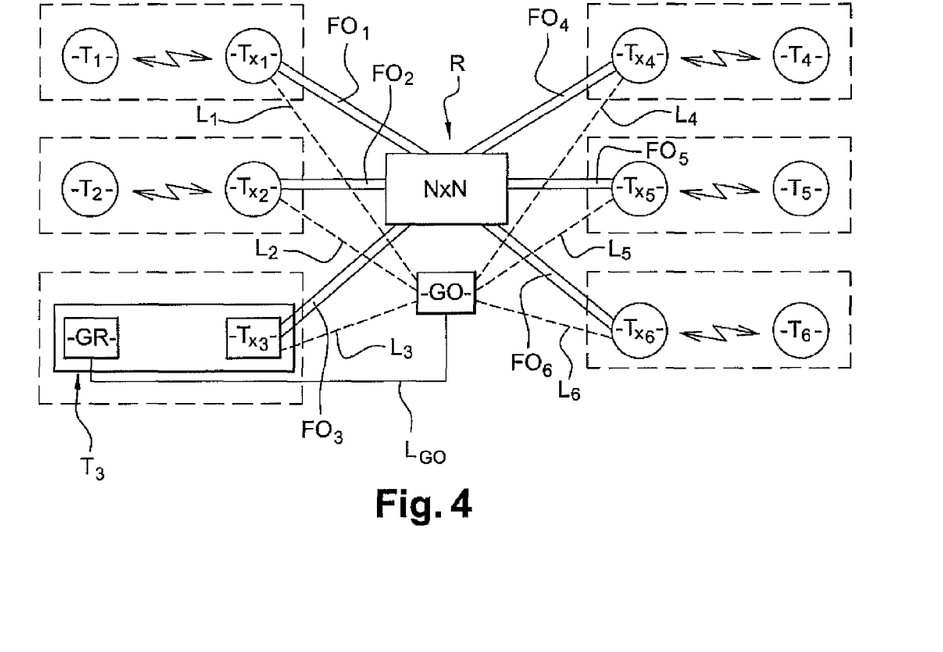
FIG. 4 represents a network in which a radio signal is transmitted according to RoF technology according to a second embodiment of the invention.

FIG. 4 represents a private optical network R according to a second embodiment of the invention. The elements forming this network which are identical to those described with reference to FIG. 3 are not described again.

In such a network R, the optical management module GO is connected to each radio module $Tx_i$ by means of a dedicated link $L_i$ and can therefore transmit to each of the radio modules $Tx_i$ a control signal comprising an activation request to activate the optical processing means EO/RO of the radio modules $Tx_i$. In one particular embodiment of the invention, the optical management module GO also emits a deactivation request to deactivate the optical processing means once the radio signal to be emitted has been processed.

The links $L_i$ may be optical links or copper links. When the links are copper links, it is possible to remotely power the radio modules.

Figure 5:
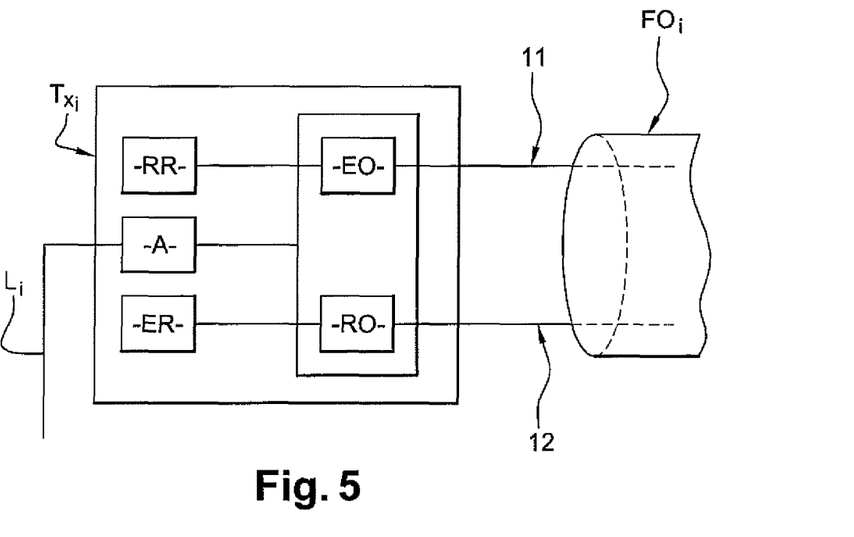
FIG. 5 represents a radio module capable of applying the RoF technology according to a first variant embodiment of the invention.

FIG. 5 represents a radio module $Tx_i$ according to an embodiment of the invention. The radio module $Tx_i$ comprises emission/reception means ER/RR for a radio signal and optical processing means 1 for a radio signal. The emission/reception means ER/RR are connected respectively to reception means of an optical carrier RO and to emission means of an optical carrier EO. The optical emission means EO are connected to a segment of optical fiber 11 forming the optical link $FO_i$. The optical reception means RO are connected to a segment of optical fiber 12 forming the optical link $FO_i$. Finally, the radio module $Tx_i$ comprises activation means A connected to optical management module GO. The activation means A comprise means for receiving an activation request emitted by the optical management module GO. In one embodiment of the invention, the reception means for receiving an activation request are also capable of receiving a deactivation request for deactivating the optical processing means 1.

Figure 6:
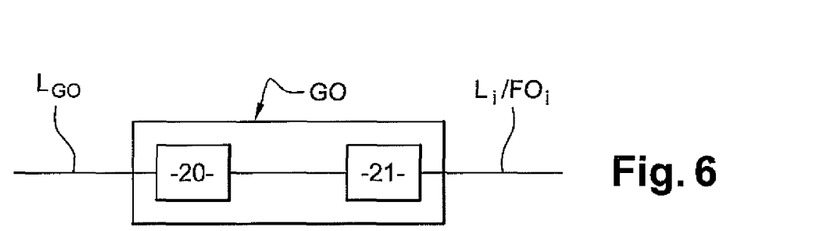
FIG. 6 represents a control module according to an embodiment of the invention.

An optical management module GO is shown in FIG. 6. Such an optical management module GO comprises means 20 for receiving a radio signal transmission request emitted by the radio terminal $T_m$ and transmitted by the radio management module GR, and means 21 for emitting, to the radio module $Tx_i$, an activation request to activate the optical processing means EO/RO of the radio module $Tx_i$.

In one particular embodiment of the invention, the radio management module GR and the optical management module GO are included in one and the same management device. Such a management device may itself be included in the radio terminal $T_3$.

Figure 7:
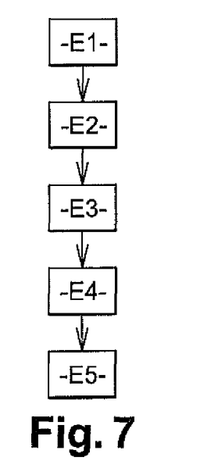
FIG. 7 represents the steps of a method for transmitting a radio signal in the optical network that is the subject of an embodiment of the invention.

With reference to FIG. 7, during a step E1, the radio management module GR receives a radio signal transmission request emitted by a radio terminal $T_m$. Such a transmission request comprises transmission-related parameters of the radio signal such as an identifier of the terminal emitting the radio signal, an identifier of at least one radio terminal intended to receive the radio signal, an item of information relating to the duration of the transmission.

During a step E2, the radio management module GR transmits this transmission request to the optical management module GO over the link $L_{GO}$.

On receipt of the transmission request, the optical management module GO extracts, during a step E3, the transmission-related parameters of the radio signal. During a step E4, the optical management module GO generates an activation request to activate the optical processing means of the radio module associated with the terminal $T_m$ emitting the transmission request based on the transmission-related parameters and on items of information such as the radio terminal $T_m$/radio module $Tx_i$ association. The optical management module determines, from the transmission-related parameters of the radio signal, the identity of the radio module $Tx_i$ associated with the radio terminal $T_m$ emitting the transmission request and its location in the network R, and the duration of the transmission.

Finally, during a step E5, the optical management module emits the activation request to the concerned radio module $Tx_i$.

The optical management module GO may also, in a variant embodiment, generate an activation request to activate the optical processing means of the radio module associated with the terminal $T_n$ to which the radio signal is emitted. To do this, the optical management module GO generates such an activation request based on the transmission-related parameters and on items of information such as the radio terminal $T_n$/radio module $Tx_j$ association. The optical management module determines, based on the transmission-related parameters of the radio signal, the identity of the radio module $Tx_j$ associated with the radio terminal $T_n$ and its location in the network R.

In another variant embodiment of the invention, the optical management module GO also generates a deactivation request to deactivate the optical processing means.

In another variant embodiment, the optical management module GO determines, based on the transmission-related parameters of the radio signal, the time during which the optical processing means EO/RO must be activated. The activation request to activate the optical processing means EO/RO includes this information. Thus, the optical processing means EO/RO are activated for a certain time after which they are deactivated.

Figure 8:
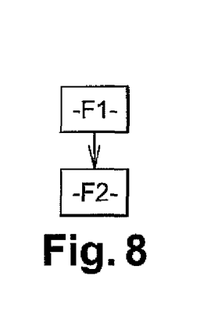
FIG. 8 represents the steps of a method for processing a radio signal by a radio module according to an embodiment of the invention.

With reference to FIG. 8, during a step F1, a radio module $Tx_i$ receives an activation request to activate the optical processing means EO/RO emitted by the optical management module GO following the reception by the latter of a request to transmit a radio signal.

Thus, on receipt of the activation request by the activation means A, the latter activate the optical processing means EO/RO during a step F2. The optical emission means EO then modulate a laser-generated optical carrier by means of the data included in the radio signal emitted by the radio terminal communicating with the radio module $Tx_i$. The optical carrier thus modulated is then transmitted in the network R over the segment of optical fiber $FO_i$.

In another variant embodiment of the invention, the activation means A receive a deactivation request to deactivate the optical processing means EO/RO. Thus, on receipt of the deactivation request by the activation means A, the latter deactivate the optical processing means EO/RO.

Although the present disclosure has been described with reference to one or more examples, workers skilled in the art will recognize that changes may be made in form and detail without departing from the scope of the disclosure and/or the appended claims.

The invention claimed is:

1. A method for performing a data transmission from a radio module associated with a radio terminal, the radio terminal being authorized by a radio management module connected to the radio terminal by a radio link to emit a radio signal corresponding to the data transmission to the radio module, the radio module comprising optical processing elements capable of modulating the radio signal on an optical carrier in one direction and of demodulating the optical carrier in the other direction, the optical processing elements being connected to one end of an optical link via which the radio signal modulated on the optical carrier is intended to be transmitted, wherein the method comprises:
receiving, by the radio module, an activation request to activate the optical processing elements, said request being generated by an optical management module connected to the radio management module and according to transmission-related parameters included in a transmission request emitted by the radio terminal to the radio management module; and
in response to receiving the activation request, activating the optical processing elements of the radio module associated with the radio terminal during the duration of the data transmission.

2. A non-transitory computer-readable recording medium comprising a computer program comprising program-code instructions for application of steps of a method for performing a data transmission from a radio module associated with a radio terminal when the program is executed by a processor, wherein the radio terminal being authorized by a radio management module connected to the radio terminal by a radio link to emit a radio signal corresponding to the data transmission to the radio module, the radio module comprising optical processing elements capable of modulating the radio signal on an optical carrier in one direction and of demodulating the optical carrier in the other direction, the optical processing elements being connected to one end of an optical link via which the radio signal modulated on the optical carrier is intended to be transmitted, wherein the method comprises the following acts controlled by the processor:
receiving, by the radio module, an activation request to activate the optical processing elements, said request being generated by an optical management module connected to the radio management module and according to transmission-related parameters included in a transmission request emitted by the radio terminal to the radio management module; and
in response to receiving the activation request, activating the optical processing elements of the radio module associated with the radio terminal during the duration of the data transmission.

3. A method for processing a data transmission request from a radio terminal to a radio management module connected to the radio terminal by a radio link, the radio management module being capable of authorizing the radio terminal to emit a radio signal corresponding to the data transmission to a radio module associated with the radio terminal, the radio module comprising optical processing elements capable of modulating the radio signal on an optical carrier in one direction and of demodulating the optical carrier in the other direction, the optical processing elements being connected to one end of an optical link via which the radio signal modulated on the optical carrier is intended to be transmitted, wherein the method comprises the following steps, applied by an optical management module connected to the radio management module:
receiving a request to transmit the radio signal from the radio management module, which comprises transmission-related parameters including a duration of the data transmission;
in response to receipt of the request to transmit the radio signal, generating an activation request to activate the optical processing elements of the radio module associated with the radio terminal according to the transmission-related parameters included in the request to transmit the radio signal, and
emitting, to at least the associated radio module, the activation request to activate the optical processing elements during the duration of the data transmission.

4. The method as claimed in claim 3, comprising a step of emitting, to at least the associated radio module, a deactivation request to deactivate the optical processing elements.

5. The method as claimed in claim 3, wherein the transmission-related parameters comprise an identifier of the radio terminal emitting the radio signal and an item of information relating to the duration of the transmission.

6. A non-transitory computer-readable recording medium comprising a computer program recorded thereon and comprising program-code instructions for application of steps of a method for processing a data transmission request from a radio terminal to a radio management module when the program is executed by a processor, wherein the radio management module is connected to the radio terminal by a radio link configured to authorize the radio terminal to emit a radio signal corresponding to the radio transmission to a radio module associated with the radio terminal, the radio module comprising optical processing elements capable of modulating the radio signal on an optical carrier in one direction and of demodulating the optical carrier in the other direction, the optical processing elements being connected to one end of an optical link via which the radio signal modulated on the optical carrier is intended to be transmitted, wherein the method comprises the following steps, applied by an optical management module connected to the radio management module:
receiving the request to transmit the radio signal from the radio management module, which comprises transmission-related parameters including a duration of the data transmission;
in response to receipt of the request to transmit, generating with the processor an activation request to activate the optical processing elements of the radio module associated with the radio terminal according to the transmission-related parameters included in the request to transmit the radio signal, and
emitting, to at least the associated radio module, the activation request to activate the optical processing elements the duration of the data transmission.

7. An optical management module capable of processing a data transmission request from a radio terminal to a radio management module, the radio management module being connected to the radio terminal by a radio link and capable of authorizing the radio terminal to emit a radio signal corresponding to the data transmission to a radio module associated with the radio terminal comprising optical processing elements capable of modulating the radio signal on an optical carrier in one direction and of demodulating the optical carrier in the other direction, the optical processing elements being connected to one end of an optical link via which the radio signal modulated on the optical carrier is intended to be transmitted,  wherein the optical management module is connected to the radio management module and comprises:

means for receiving a request to transmit the radio signal from the radio management module, which comprises transmission-related parameters including a duration of the data transmission;

means for generating, in response to receipt of the request to transmit the radio signal, an activation request to activate the optical processing elements of the radio module associated with the radio terminal according to the transmission-related parameters included in the request to transmit the radio signal, and  means for emitting, to at least the associated radio module, the activation request to activate the optical processing elements during the duration of the data transmission.

8. A radio module associated with a radio terminal, the radio terminal being connected to a radio management terminal by a radio link and being authorized by the radio management module to emit a radio signal corresponding to a data transmission to the radio module, the radio module comprising optical processing elements capable of modulating the radio signal on an optical carrier in one direction and of demodulating the optical carrier in the other direction, the optical processing elements being connected to one end of an optical link via which the radio signal modulated on the optical carrier is intended to be transmitted,  wherein the radio module comprises:

means for receiving an activation request to activate the optical processing elements, said request being generated by an optical management module connected to the radio management module and according to transmission-related parameters included in a transmission request emitted by the radio terminal to the radio management module; and  means for activating the optical processing elements of the radio module associated with the radio terminal during the duration of the data transmission, in response to receiving the activation request.

9. A communication network comprising:

at least one optical link, a radio management module, at least one radio terminal configured to emit a data transmission request to the radio management module, the radio management module being connected to the radio terminal by a radio link and configured to authorize the radio terminal to emit a radio signal corresponding to the data transmission to a radio module associated with the radio terminal and which comprises optical processing elements capable of modulating the radio signal received on an optical carrier in one direction and of demodulating the optical carrier in the other direction, the optical processing elements being connected to one end of the at least one optical link via which the radio signal is intended to be transmitted, and an optical management module connected to the radio management module, wherein the optical management module comprises:

means for receiving a request to transmit the radio signal from the radio management module, which comprises transmission-related parameters including a duration of the data transmission,  means for generating, in response to receipt of the request to transmit the radio signal, an activation request to activate the optical processing elements of the radio module associated with the radio terminal according to the transmission-related parameters included in the request to transmit the radio signal,  means for emitting, to at least the associated radio module, the activation request to activate the optical processing means during the duration of the data transmission, and wherein the radio module comprises means for receiving the activation request to activate the optical processing elements.

\* \* \* \* \*